United States Patent
Wenger et al.

(10) Patent No.: US 6,367,460 B1
(45) Date of Patent: *Apr. 9, 2002

(54) GAS-DYNAMIC PRESSURE WAVE MACHINE

(75) Inventors: Urs Wenger, Langenthal; Roger Martin, Othmarsingen, both of (CH)

(73) Assignee: Swissauto Engineering S.A. (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/486,288

(22) PCT Filed: Aug. 25, 1998

(86) PCT No.: PCT/EP98/05378

§ 371 Date: Feb. 25, 2000

§ 102(e) Date: Feb. 25, 2000

(87) PCT Pub. No.: WO99/11914

PCT Pub. Date: Mar. 11, 1999

(30) Foreign Application Priority Data

Aug. 29, 1997 (EP) ............................................. 97810615

(51) Int. Cl.$^7$ ................................................. F02B 33/00
(52) U.S. Cl. ..................................... 123/559.2; 417/64
(58) Field of Search .................... 123/559.2; 60/600, 60/601, 602, 603, 39.45; 417/64

(56) References Cited

U.S. PATENT DOCUMENTS

| | | | | |
|---|---|---|---|---|
| 4,398,868 A | * | 8/1983 | Komauer et al. | 417/64 |
| 4,488,532 A | * | 12/1984 | Mayer | 123/559.2 |
| 4,517,950 A | * | 5/1985 | Mayer et al. | 123/559.2 |
| 4,561,407 A | * | 12/1985 | Jaussi et al. | 123/559.2 |
| 4,796,595 A | * | 1/1989 | El-Nashar et al. | 123/559.2 |

FOREIGN PATENT DOCUMENTS

| | | |
|---|---|---|
| CH | 681738 | 5/1993 |
| EP | 0210328 | 2/1987 |
| JP | 62-020630 | 1/1987 |
| JP | 1-060717 | 3/1989 |
| JP | 4-081510 | 3/1992 |
| WO | 97/20134 | 6/1997 |
| WO | 97/33080 | 9/1997 |

\* cited by examiner

*Primary Examiner*—Hoang Nguyen
(74) *Attorney, Agent, or Firm*—Ostrolenk, Faber, Gerb & Soffen, LLP

(57) ABSTRACT

The gas-dynamic pressure wave machine, which is destined for the charge air supply of an internal combustion engine, comprises a rotor, a low pressure fresh air inlet channel, a high pressure charge air channel leading to the internal combustion engine, a high pressure exhaust channel coming from the internal combustion engine, and a low pressure exhaust channel, the low pressure exhaust channel and the high pressure exhaust channel being enclosed in a gas enclosure and the low pressure fresh air inlet channel and the high pressure charge air channel being enclosed in an air enclosure. In order to obtain an improved efficiency in low flow rate and temperature conditions, the high pressure exhaust channel is enlarged on the rotor side without forming a ridge, and the size of the enlargement is variable. The use of a heating device acting upon the high pressure exhaust channel allows a further improvement of the cold start properties, without the need for an enlargement or gas pockets. A substantial improvement in efficiency is obtained by the individual use of each one of these measures.

17 Claims, 3 Drawing Sheets

GAS-DYNAMIC PRESSURE WAVE MACHINE

The present invention refers to a gas-dynamic pressure wave machine which is destined for the charge air supply of an internal combustion engine, comprising a rotor with cells, a low pressure fresh air inlet channel, a high pressure charge air channel leading to the internal combustion engine, a high pressure exhaust channel coming from the internal combustion engine, and a low pressure exhaust channel, the low pressure exhaust channel and the high pressure exhaust channel being enclosed in a gas enclosure and the low pressure fresh air inlet channel and the high pressure charge air channel being enclosed in an air enclosure.

Figure 1:
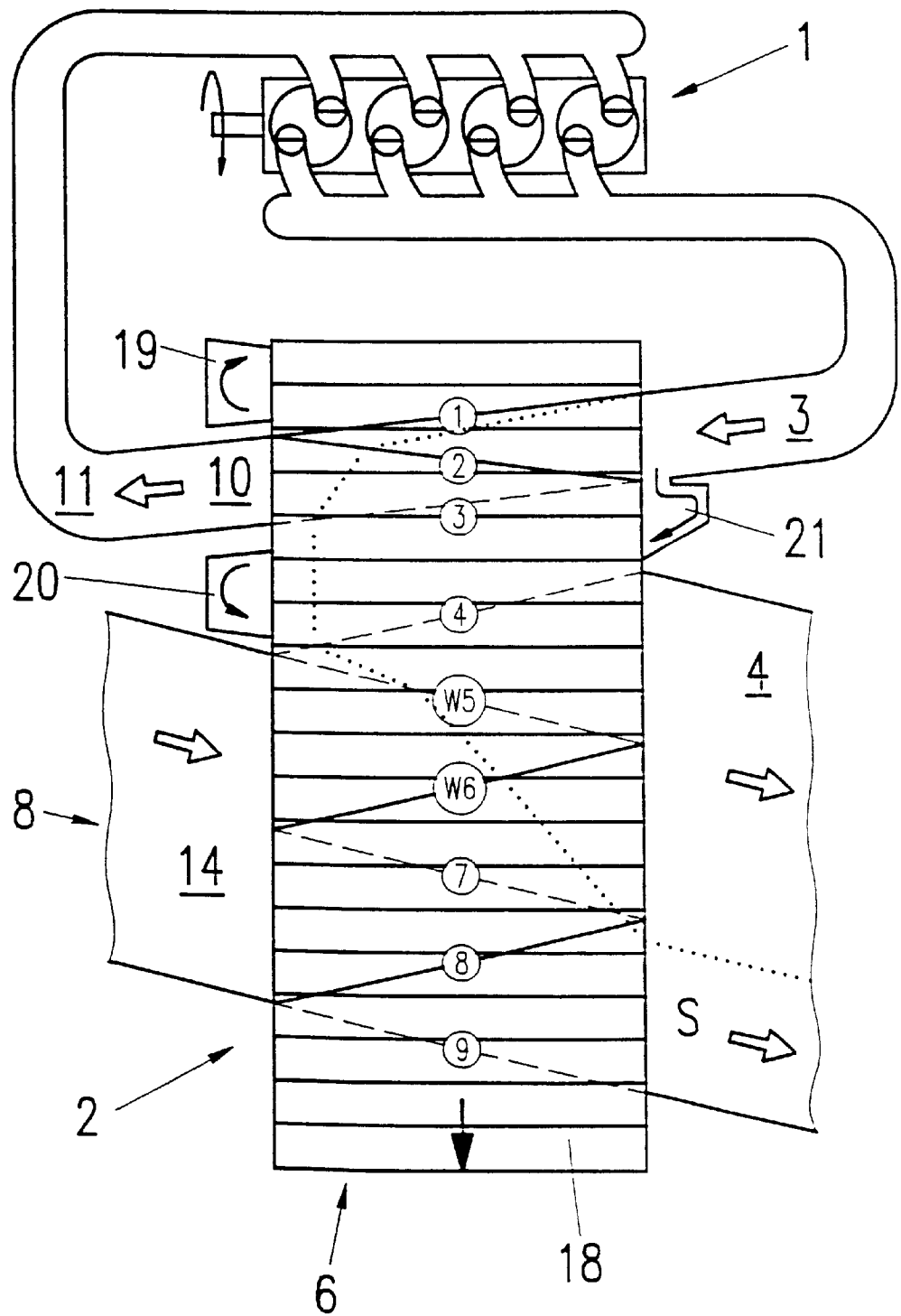

A pressure wave machine of this kind is known from the prior art, e.g. from CH-A-681 738. It is a first general object of the present invention to improve the efficiency of a gas-dynamic pressure wave machine according to the prior art as it is schematically illustrated in FIG. 1 by means of different measures.

In a gas-dynamic pressure wave machine according to the prior art, comprising four channels and no additional control systems such as pockets, which is used in order to supercharge an internal combustion engine, the pressure wave process can only be adjusted for a single operating speed of the internal combustion engine, i.e. the so-called design point of the pressure wave machine. The use of pockets in the enclosure walls allows a less tuning-sensitive design of the pressure wave machine and a significant extension of its load, speed, and volume range. The disadvantage of this method is that in the range of untuned performance, the pressure wave process is diverted to secondary processes which cannot yield optimum efficiency. The result is an increase of the losses caused by such secondary processes in the pockets, e.g. inflowing and outflowing gases and the production of pressure and expansion waves in the pockets.

The transition from the so-called primary process, also called compression pocket process, to the principal process, i.e. the tuned process, causes disturbances in the pressure wave process which cause scavenging disruptions and thus ranges of increased recirculation of exhaust gas into the charge air. In order to prevent an increased recirculation in these ranges as well as during starting, an inlet leading to the gas pocket, either in the form of a milled sill or of a controlled inlet as disclosed in the above-mentioned document, must be provided, which however produces further losses due to a diversion of high pressure energy into the low pressure process.

In the case of low flow rates and low temperatures, i.e. during starting, idle running, or under partial load, the recirculation sensitivity strongly increases. Under these conditions, standard pressure wave machines run in an untuned range where the energy level is too low to allow an undisturbed pressure wave process. In standard machines, in order to make this range operable, a part of the exhaust gases is deviated to gas pockets prior to the admission of the high pressure exhaust gas to the rotor in order to improve the scavenging of the rotor, either by means of a fixed feed or by means of the variable feed disclosed in CH-A-681 738. A disadvantage of this system is that the build-up of the charging pressure is substantially reduced since a part of the exhaust gas which is normally available for the high pressure process is diverted to the low pressure process.

On the background of this prior art, it is a first object of the invention to provide a pressure wave machine having an improved efficiency in low flow rate and low temperature conditions without the use of gas pockets. This object is attained by a pressure wave machine wherein the high pressure exhaust channel is enlarged on the rotor side and comprises means allowing to vary the enlargement without forming a ridge.

Another object of the present invention is to improve the cold start properties of a pressure wave machine in such a manner that a regulation by means of gas pockets or recesses in the enclosure of the pressure wave machine can be partially or entirely omitted. This object is attained by a pressure wave machine wherein a heating device is provided between the outlet of the internal combustion engine and the high pressure exhaust channel.

Further advantages and embodiments of the pressure wave machine are defined in the dependent claims.

The invention is explained in more detail hereinafter with reference to a drawing of exemplary embodiments.

Figure 2:
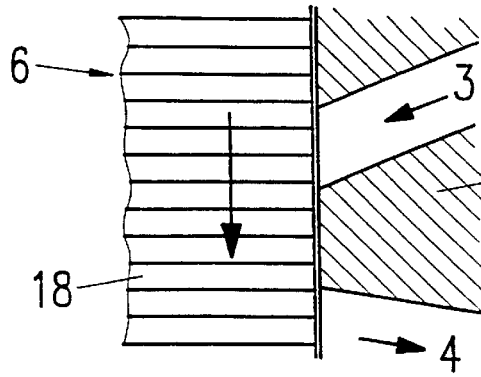
Figure 3:
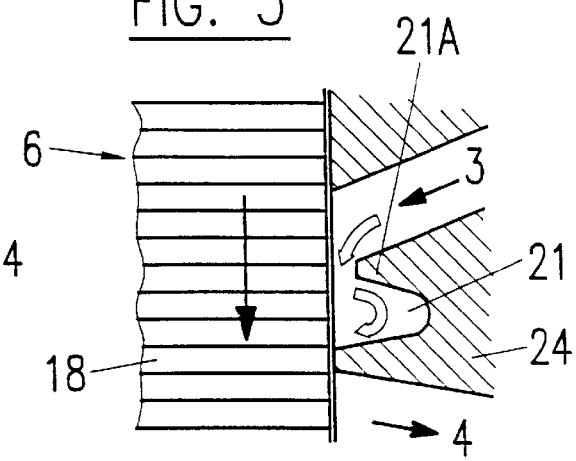
Figure 4:
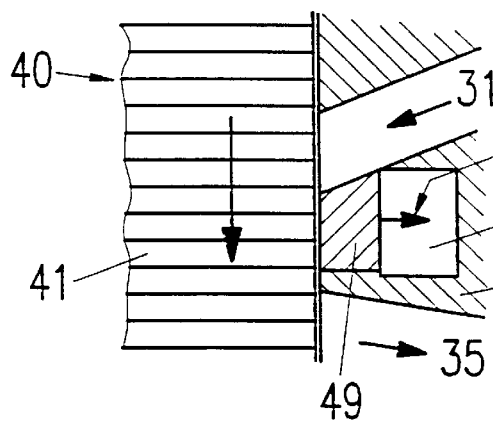
Figure 4A:
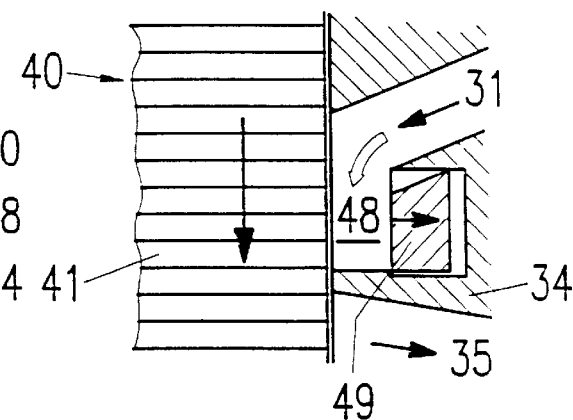
Figure 5:
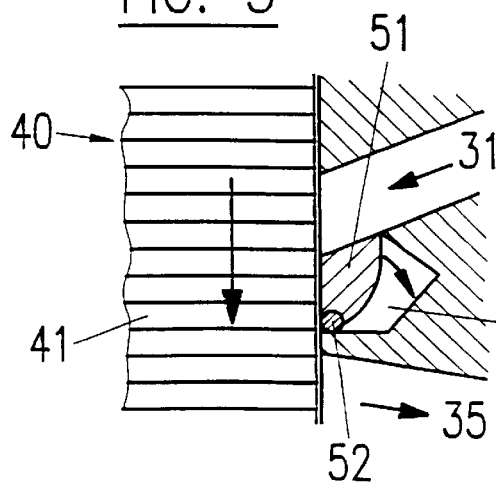
Figure 5A:
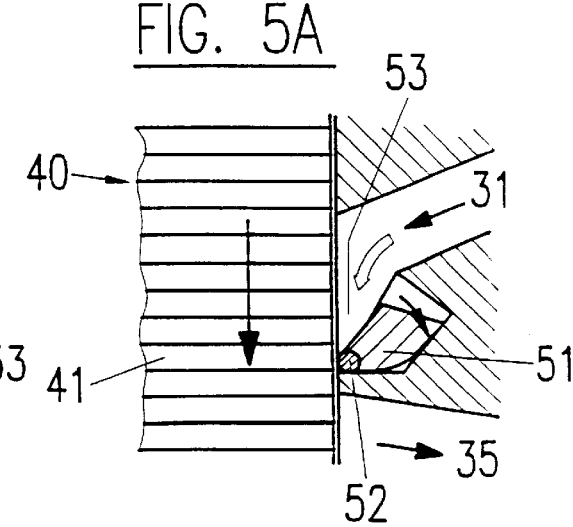

FIG. 1 schematically shows a developed cylindrical section through the cells of a rotor of a pressure wave machine of the prior art;

FIG. 2 schematically shows a detail of a developed cylindrical section through the cells of the rotor of a pressure wave machine of the prior art;

FIG. 3 schematically shows a detail of a developed cylindrical section through the cells of the rotor of another pressure wave machine of the prior art;

FIGS. 4, 4A schematically show a detail of a developed cylindrical section through the cells of the rotor of a pressure wave machine of the invention;

FIGS. 5, 5A show a variant of the embodiment of FIGS. 4, 4A; and

Figure 6:
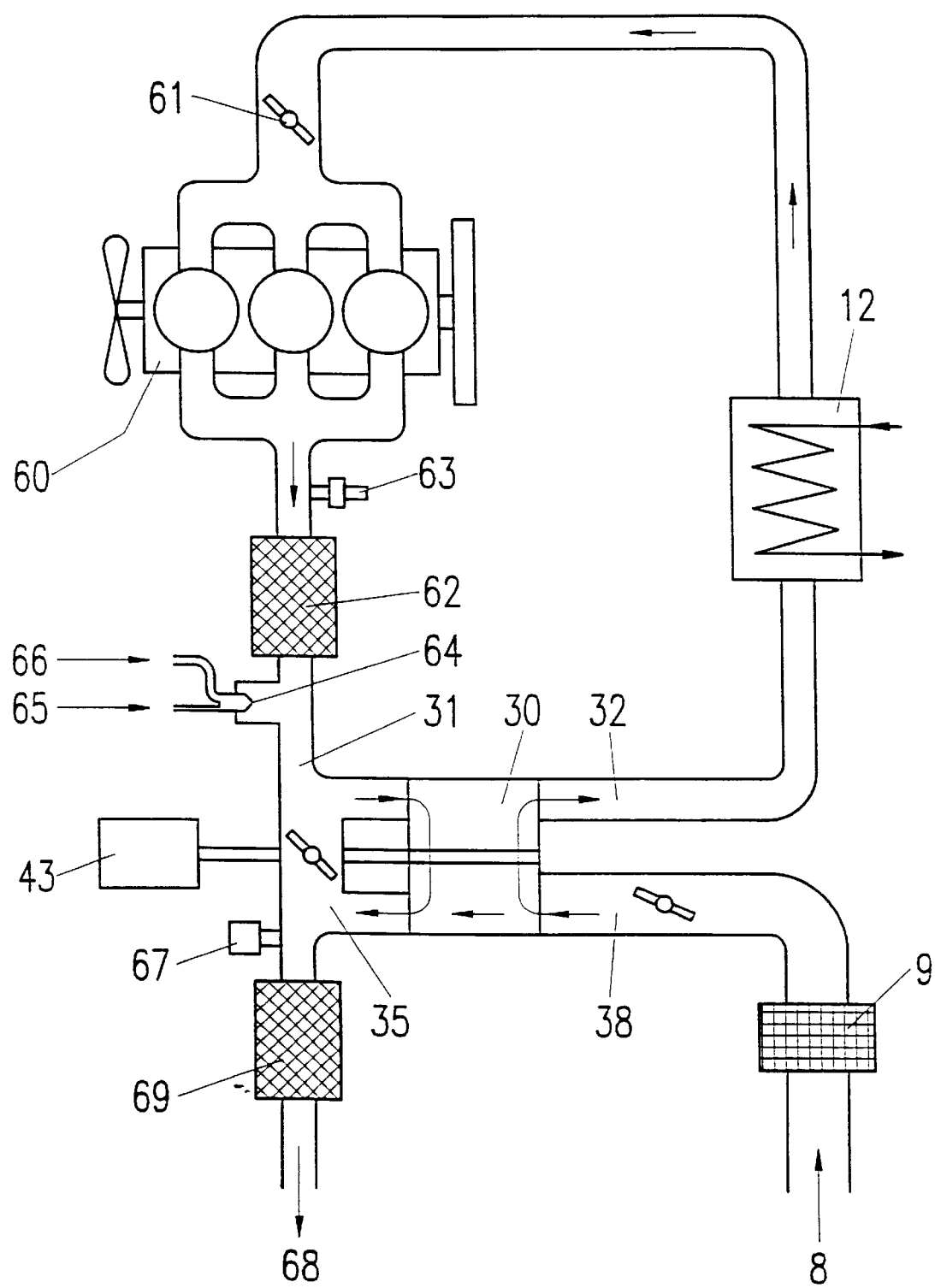

FIG. 6 schematically shows a pressure wave machine comprising a heating device and catalysts.

For the sake of simplicity, a single pressure wave cycle is described and represented in the developed views. However, the invention is independent from the number of pressure wave cycles, and it may be applied to pressure wave machines having a single cycle or two or more cycles.

FIG. 1 shows a developed view of the rotor of a pressure wave machine, as well as internal combustion engine 1, gas-dynamic pressure wave machine 2, high pressure exhaust channel 3 and low pressure exhaust channel 4 including scavenging air S, rotor 6 with individual cells 18, fresh air inlet 8 resp. low pressure fresh air inlet channel 14, and high pressure charge air channel 10 which communicates with charge air passage 11 and leads to internal combustion engine 1.

As already mentioned in the introduction, the process can only be adjusted to a single operating speed of the internal combustion engine if the four channels are used without any additional regulating devices. In this context, this is called the design point of the pressure wave machine. The use of pockets in the enclosure wall allows a more tuning-insensitive design of the pressure wave machine and thus an important expansion of its load, speed, and volume range. In the course of the development of such pressure wave machines over the years, different pockets have been milled into the enclosure wall, e.g., as shown in FIG. 2, a compression pocket 19, an expansion pocket 20, and a gas pocket 21 whose applications are well known to those skilled in the art. An disadvantage in the application of such pockets is that in the range of untuned performance, the pressure wave process is diverted to secondary processes which never yield optimum efficiency.

Normally, the pressure wave machine is optimally designed for the point specified by the manufacturer of the internal combustion engine, usually at the nominal speed of the motor, by means of known methods such as characteristics methods and design calculations while no pockets are involved or one, two, or all three pockets are used.

FIGS. 2 to 5 refer to the action upon the high pressure exhaust flow. Similarly to FIG. 1, FIG. 2 shows a high pressure exhaust channel which does not have means in order to influence the high pressure exhaust flow. Rotor 6 with its cells 18 is represented in a developed view, and gas enclosure 24, high pressure exhaust channel 3, and low pressure exhaust channel 4 are further illustrated.

In addition to these elements, FIG. 3 shows gas pocket 21 as it is e.g. provided according to CH-A-681 738 which has been mentioned in the introduction. This gas pocket, as well as the necessarily existing ridge 21A between the high pressure exhaust channel and the gas pocket, create additional losses, especially in the case of low to medium speeds, temperatures and flow rates of the internal combustion machine where a blow-off is normally unnecessary.

In FIGS. 4, 4A and 5, 5A, a device allowing to influence the high pressure exhaust channel according to the invention is schematically illustrated.

FIGS. 4 and 4A show a developed view of rotor 40 with its cells 41 while gas enclosure 34 comprises, in contrast to the gas pocket of FIG. 3, a recess 48 which can be varied by a slide valve 49 as indicated by arrow 50. In FIG. 4A, slide valve 49 is entirely engaged in the direction of the arrow, so that the high pressure exhaust channel is enlarged without creating a ridge. By a suitable control of the slide valve, which is calculable for those skilled in the art, the slide valve may be displaced so as to enlarge the high pressure channel in such a manner that the pressure drops until the charging pressure produced in the pressure wave process decreases to the desired level.

FIGS. 5 and 5A show an alternative embodiment of the slide valve in the form of a swinging element 51 which is hinged on an articulation 52 and is actuated by a similar electronic control as above, which allows an enlargement 53 of the high pressure channel.

At the same time, this device allows an important improvement of the scavenging process through the diversion from the high pressure exhaust process to the low pressure process and thus a significant improvement in efficiency. If a spark ignition engine is concerned, this method can also be used as a power regulation through a regulation of the desired charging pressure by suitable measures which are known per se. This measure, i.e. the enlargement of the high pressure exhaust channel and the prevention of gas pockets, resp. of ridges therebetween, allows an essential improvement in efficiency.

Another measure for the improvement of the efficiency of the pressure wave machine, particularly in cold start conditions, is schematically illustrated in FIG. 6 in a simplified manner. Identical elements are designated by the same reference numerals. Pressure wave machine 30 is connected to internal combustion engine 60, e.g. a spark ignition engine, by means of high pressure exhaust channel 31 and high pressure charge air channel 32. Furthermore, the pressure wave machine comprises the two low pressure channels 35 and 38, and air inlet 8 and air filter 9, charge air cooler 12, a throttle 61 as well as motor output 43 are illustrated.

In order to improve the cold start behavior, a heating device 64 in the form of a burner comprising a fuel supply 65 and an air supply 66 is interposed between the outlet of the internal combustion engine and high pressure exhaust channel 31 of the pressure wave machine. Numeral 67 designates a temperature probe. In the present example comprising a spark ignition engine, a regulated three-way catalyst 62 including lambda probe 63 is disposed between the outlet of the engine and the high pressure exhaust channel, and heating device 64 is disposed between catalyst 62 and the pressure wave machine, i.e. the heating device acts both on the catalyst and on the pressure wave machine and thus provides an improvement of the cold start properties of both aggregates. In order to obtain a particularly efficient exhaust gas cleaning, another catalyst is provided between the low pressure exhaust channel and exhaust pipe 68, namely an oxidation catalyst 69.

The use of a heating device acting upon the high pressure exhaust channel allows to prevent that the pressure wave supercharger runs at an insufficient energy level during cold start and thus makes use of the gas pocket or necessitates an enlargement of the high pressure exhaust channel. Accordingly, the use of the heating device reduces or entirely prevents a flow towards the gas pockets, and the charging pressure is built up substantially faster. The closure of the gas pockets allows to prevent that a part of the heating energy is blown off unused.

The same applies for a system without three-way catalysts, e.g. for a diesel engine, which may only comprise the mentioned oxidation catalyst at a point upstream or downstream of the pressure wave machine, as the case may be.

The heating device already offers an improvement in a pressure wave machine whose construction otherwise corresponds to the prior art, but particularly also in a pressure wave machine having an enlargement of the high pressure exhaust channel as well as one or two catalysts or no one.

What is claimed is:

1. A gas-dynamic pressure wave machine for a charge air supply of an internal combustion engine, the pressure wave machine comprising:
   a driven rotor;
   an air enclosure having an air inlet channel in communication with the rotor and a charge air channel leading from the rotor to an inlet of the internal combustion engine;
   a gas enclosure having a first exhaust channel leading from an exhaust of the internal combustion engine to the rotor and a second exhaust channel in communication with the rotor,
   wherein the first exhaust channel includes a ridgeless enlargement on the rotor side thereof, the enlargement having a member operable to vary the size of the enlargement.

2. The gas-dynamic pressure wave machine of claim 1, wherein the air inlet channel has a lower pressure than that of the charge air channel.

3. The gas-dynamic pressure wave machine of claim 2, wherein the first exhaust channel has a higher pressure than that of the second exhaust channel.

4. The gas-dynamic pressure wave machine of claim 1, wherein the pressure wave machine is connected to a spark ignition engine and includes a three-way catalyst disposed between an outlet of the engine and the first exhaust channel of the pressure wave machine.

5. The gas-dynamic pressure wave machine of claim 4, wherein an oxidation catalyst is connected between the second exhaust channel and an outlet of the pressure wave machine.

6. The gas-dynamic pressure wave machine of claim 4, further comprising a heating device disposed between the three-way catalyst and the first exhaust channel of the pressure wave machine.

7. The gas-dynamic pressure wave machine of claim 6, wherein the heating device is a burner comprising an air and a fuel supply.

8. The gas-dynamic pressure wave machine of claim 1, further comprising a heating device acting upon the first exhaust channel.

9. The gas-dynamic pressure wave machine of claim 8, wherein the heating device is a burner comprising an air and a fuel supply.

10. The gas-dynamic pressure wave machine of claim 1, wherein the member is a controlled slide valve.

11. The gas-dynamic pressure wave machine of claim 1, wherein the member is a swinging slide valve.

12. A gas-dynamic pressure wave machine for a charge air supply of an internal combustion engine, the pressure wave machine comprising:

a driven rotor;

an air enclosure having an air inlet channel in communication with the rotor and a charge air channel leading from the rotor to an inlet of the internal combustion engine;

a gas enclosure having a first exhaust channel leading from an exhaust of the internal combustion engine to the rotor and a second exhaust channel in communication with the rotor; and a heating device acting upon the first exhaust channel.

13. The gas-dynamic pressure wave machine of claim 12, wherein the air inlet channel has a lower pressure than that of the charge air channel.

14. The gas-dynamic pressure wave machine of claim 13, wherein the first exhaust channel has a higher pressure than that of the second exhaust channel.

15. The gas-dynamic pressure wave machine of claim 12, wherein the heating device is disposed between an outlet of the engine and the first exhaust channel of the pressure wave machine.

16. The gas-dynamic pressure wave machine of claim 12, wherein the heating device is a burner comprising an air and a fuel supply.

17. The gas-dynamic pressure wave machine of claim 12, wherein the heating device is a burner comprising an air and a fuel supply.

* * * * *